(12) United States Patent
Frost et al.

(10) Patent No.: US 12,109,633 B1
(45) Date of Patent: Oct. 8, 2024

(54) INTEGRATED TOOLLESS CLAMP

(71) Applicant: Carr Lane Manufacturing Company, St. Louis, MO (US)

(72) Inventors: Colin Walker Frost, St. Louis, MO (US); Joshua Matthew Herschbach, Highland, IL (US); Michael William Viejo-Robles, St. Louis, MO (US)

(73) Assignee: Carr Lane Manufacturing Company, St. Louis, MO (US)

( * ) Notice: Subject to any disclaimer, the term of this patent is extended or adjusted under 35 U.S.C. 154(b) by 53 days.

(21) Appl. No.: 18/144,673

(22) Filed: May 8, 2023

(51) Int. Cl.
*B23B 31/107* (2006.01)

(52) U.S. Cl.
CPC ................................. *B23B 31/1071* (2013.01)

(58) Field of Classification Search
CPC ...... B23B 31/1071; B23B 31/107; B23Q 3/12
See application file for complete search history.

(56) References Cited

U.S. PATENT DOCUMENTS

| | | | |
|---|---|---|---|
| 2,439,531 A | 4/1948 | Wallace | |
| 2,515,807 A | 7/1950 | Spooner | |
| 2,779,228 A | 1/1957 | Meepos et al. | |
| 3,101,641 A | 8/1963 | Walker et al. | |
| 3,117,484 A * | 1/1964 | Myers | F16B 5/0208 411/348 |
| 4,932,295 A | 6/1990 | Erickson | |
| 5,394,594 A * | 3/1995 | Duran | F16B 21/165 403/321 |
| 5,810,366 A * | 9/1998 | Montjoy | B23B 31/202 279/158 |
| 5,845,898 A * | 12/1998 | Halder | F16B 21/165 269/49 |
| 6,386,789 B1 * | 5/2002 | Chausse | F16B 21/165 403/322.2 |
| 8,720,874 B2 * | 5/2014 | Tschida | F16B 19/109 269/48.1 |
| 9,303,674 B2 * | 4/2016 | Demmeler | F16B 21/18 |
| 2016/0311032 A1 * | 10/2016 | Schenk | B23B 31/1071 |

OTHER PUBLICATIONS

"Carr Lock Clamps," Carr Lane Manufacturing, 2023, retrieved on Sep. 20, 2023, https://www.carrlane.com/product/carr-lock-system/carr-lock-clamps, 2 pages.

* cited by examiner

*Primary Examiner* — Seahee Hong
(74) *Attorney, Agent, or Firm* — Lewis Rice LLC

(57) ABSTRACT

A toolless clamp, toolless clamping system, and methods of use comprising a torque-limited rotation system operatively coupled to a ball-lock pin. The rotational system may be manually tightened without use of a tool to advance a spring-actuated spindle of the ball-lock system to engage lock balls. The clamp shank has a D-shaped cross-section corresponding to a D-shaped bushing in the fixture to inhibit rotational movement of the clamp during tightening. The clamp and D-shaped bushing may be used with a receiver bushing in the subplate to receive and retain the lock balls when deployed from the ball-lock pin.

12 Claims, 6 Drawing Sheets

INTEGRATED TOOLLESS CLAMP

BACKGROUND OF THE INVENTION

Field of the Invention

This disclosure is related to the field of machine tooling, and, in particular, to an integrated toolless clamp.

Description of the Related Art

Manufacturing processes almost always require that a number of component parts to the finished product are separately constructed and then assembled into the final finished product. This basic process has been used for millennia to assemble a complex device from simple component pieces. Whether in woodworking, cabinetry, or metalworking, there is a need both to hold a workpiece in place and to hold multiple workpieces together.

Additionally, particularly with machining operations, a workpiece may need to be held in place for machining at a very specific and precise position. Machine tooling clamps are devices used to hold workpieces securely in place during such operations. These clamps can be operated in a variety of ways, such as through the use of screws, levers, or hydraulic or pneumatic pressure. The clamping mechanism, once activated, holds the workpiece in place, and must provide enough force to prevent the workpiece from shifting or moving during machining operations, which can result in inaccuracies or damage to the workpiece.

An example of a prior art clamping device is shown in FIG. 1. In the depicted embodiment of FIG. 1, a fixture (111) having a fixture bore (117) therethrough is affixed to a subplate (109) having a subplate bore (115) therethrough, by use of a clamp (103). FIG. 1 depicts a liner bushing (105) disposed in the fixture bore (117), and depicts a receiver bushing (107) disposed in the subplate bore (115). The interior radii of the liner bushing (105) and of the receiver bushing (107) are the same, effectively forming a single logical cylindrical bore from the top of the fixture (111) to the base of the subplate (109) having a consistent radius. The depicted clamp (103) comprises a main body element (121) having a head element (119) disposed at a top end, and a ball-lock element (123) disposed at an opposing bottom end.

The main body element (121) is a generally cylindrical element sized and shaped to be snugly received in the single logical cylindrical bore in accordance with industry standards. The head element (119) is a squat cylindrical element having a radius larger than that of the main body element (121), so that when the clamp (103) is inserted, the bottom side of the head element (119) braces against the top side of the fixture (111) to limit the depth to which the main body element (121) descends into the single logical cylindrical bore.

A ball-lock element (123) is used to hold the clamp (103) in place. Examples of ball-lock elements (123) are known in the art. An exemplary embodiment of an adjustable pin using a ball-lock element is shown and described in U.S. Pat. No. 3,101,641, granted Aug. 27, 1963, the entire disclosure of which is incorporated herein by reference. The depicted ball-lock element (123) operates by use of ball-lock shaft or screw disposed in a hollow central column of the clamp (103). A plurality of apertures are disposed in the ball-lock element (123), each sized and shaped to partially retain a small ball (113). The balls (113) are sized and shaped such that they can partially project through the apertures, but cannot fully pass through the apertures. When partially projecting through the apertures, the distance from the outer edge of one ball (113) to the axial center of the clamp (103) is greater than the radius of the single logical cylindrical bore. However, the depicted receiver bushing (107) has two radii-a first proximal radius consistent with that of the liner bushing (105), and a distal, larger radius section disposed opposite the liner bushing (105).

The ball-lock element (123) can be captured in this second, larger section by an annual lip or rim formed at the point where the radius of the receiver bushing (107) increases. This is done by using a wrench tool (101) applied through an opening at the top of the clamp head element (119) to rotate the central pin or screw, transferring outward force to the balls (113), which then project through the apertures. To release the clamp (103), the central pin or screw is retreated using the tool (101), allowing the balls to retreat sufficiently within the interior of the ball-lock element (123) so that the clamp (103) can be retrieved from the liner bushing (105).

Such tools, while useful, have drawbacks. For one, the design requires the use of a tool, which is an additional component to purchase, stock, maintain, and track that tools also tend to have a short handle and limited reach, making them difficult to use in tight spaces and easy to drop. This in turn can make it challenging to apply suitable torque. Further, the tools are designed to fit a specific size and configuration of fastener, which means multiple tools must be maintained. The tool also relies on manual force, which means both reduced overall torque, and less precision. Finally, hand tools are relatively fragile and wear out with frequent use, which can damage the fastener by stripping or rounding the socket edges.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a toolless machine tooling clamp comprising a hand-operable torque-limited rotation system operably coupled to an ball-lock pin assembly operatively coupled to the torque-adjustable system, the ball-lock pin assembly having a generally D-shaped cross-section.

In an embodiment of the toolless machine tooling clamp, the hand-operable torque assembly comprises an outer clutch handle element operably coupled to an inner clutch handle element disposed within the outer clutch handle element.

In an embodiment of the toolless machine tooling clamp, the outer clutch element is generally in the configuration of a hollow cylinder having an outer surface and an opposing inner surface, the outer surface sized and shaped for gripping and rotation by a human hand, and the inner surface comprises a groove.

In an embodiment of the toolless machine tooling clamp, the groove comprises a first side disposed in the configuration of a radial plane relative to a major axis of the outer clutch handle element and an opposing, second side having a sloped configuration.

In an embodiment of the toolless machine tooling clamp: the inner clutch handle element is generally in the configuration of a cylinder having an axial bore defining an inner surface and extending from a first end of the inner clutch handle element to a terminus within the inner clutch handle element; the inner clutch handle element further comprises an outer surface having a radius about the same as a radius of the inner surface of the outer clutch handle element; and at least a portion of the inner surface of the inner clutch handle element is threaded.

In an embodiment of the toolless machine tooling clamp, the inner clutch handle element further comprises: a radial bore extending from the outer surface of the inner clutch handle element to a terminus disposed within the inner clutch handle element, the radial bore disposed at a position on the outer surface corresponding to the groove such that when the outer clutch handle element is rotated around the inner clutch handle element, the groove passes over the radial bore; a clutch plunger generally in the configuration of a hollow cylinder having a first closed end and an opposing open end, the clutch plunger slidingly disposed within the radial bore with the first open end proximal the terminus; and a clutch spring disposed within the clutch plunger, the clutch spring having a first end and an opposing second end, the first end extending through the open end of the clutch plunger and braced against the terminus, and the second end braced against an interior surface of the closed end of the clutch plunger, the clutch spring applying radially outward force to the clutch plunger to tend to cause the clutch plunger to retreat radially outward.

In an embodiment of the toolless machine tooling clamp, the ball-lock pin assembly comprises: a shank connected to the inner clutch handle element; a spindle slidingly disposed in the shank; a tensioning element tending to cause the spindle to retreat axially outward from the shank; and a plurality of lock balls each disposed in one of a plurality of apertures of the shank; wherein the shank comprises the D-shape cross-section.

In an embodiment of the toolless machine tooling clamp, the spindle is in the configuration of a tubular shaft having a first radius and a first end comprising an annular recess having a second radius less than the first radius, and an opposing second end having an annular cap element having a third radius greater than the first radius, the cap element disposed within the inner clutch handle element axial bore and braced against the terminus of the inner clutch handle element.

In an embodiment of the toolless machine tooling clamp, the shank comprises: a first portion comprising the generally D-shaped cross-section, the generally D-shaped cross-section comprising an arcuate portion having two ends connected by a chord to form a flattened chordal plane on the outer surface of the first portion; a second portion monolithically constructed with the first portion, the second portion in the configuration of a hollow, cylindrical element having external threads corresponding to the threads of the inner clutch handle element; and the plurality of apertures disposed proximal a first end of the first portion, the first end being distal the second portion; wherein the hollow first portion and of the hollow second portion form a contiguous axial bore coaxially receiving the spindle.

In an embodiment of the toolless machine tooling clamp, each lock ball in the plurality of lock balls is disposed in the first portion of the shank in one of the plurality of apertures and sized and shaped to partially protrude from the one of the plurality of apertures when the spindle is disposed in the shank in a first position and to retreat from the apertures when the spindle is disposed in the shank in a second position.

In an embodiment of the toolless machine tooling clamp, the tensioning element applies axial tension in a first axial direction to an end of the second portion distal the first portion, and applies axial tension in a second direction opposing the first direction to the cap element.

In an embodiment of the toolless machine tooling clamp: the spindle is operable to the first position in which the spindle recess is not adjacent the lock balls and the first radius causes each of the lock balls to project through the one of the plurality of apertures a distance greater than an outer radius of the first portion of the shank; and the spindle is operable to a second position in which the spindle recess is adjacent the lock balls and the second radius causes each of the lock balls to recede inward of the outer radius of the shank.

In an embodiment of the toolless machine tooling clamp, a tension force of the clutch plunger on the inner surface of the outer clutch handle element is effective to cause the inner clutch handle element to rotate in a first direction of rotation when the outer clutch handle element rotates in the first direction, until an amount of torque applied to the outer clutch handle element exceeds a predetermined threshold amount of torque.

Also described herein, among other things, is a toolless machine tooling clamp system comprising the toolless machine tooling clamp described herein, and a D-shaped bushing generally in the configuration of a hollow cylindrical element having an outer surface with a generally circular cross-section, and an inner surface having a D-shaped cross section comprising an arcuate portion having two ends connected by a chord to form a flattened chordal plane on the inner surface, the flattened chordal plane sized and shaped to receive the flattened chordal plane of the first portion of the shank.

In an embodiment of the toolless machine tooling clamp system, the toolless machine tooling clamp system further comprises a receiving bushing generally in the configuration of a hollow cylindrical element having an outer surface and an opposing inner surface, the inner surface having a first portion having a first radius, the first radius being about the same as the outer radius of the arcuate portion of the first portion of the shank, and a second portion having a second radius, the second radius being larger than the first radius.

Also described herein, among other things, is a method for using the toolless machine tooling clamp system described herein to clamp a fixture to a subplate, the method comprising: providing a subplate having a receiving bore; providing a fixture having a receiving bore; disposing the receiver bushing in the receiving bore of the subplate such that the second portion of the receiver bushing is distal a first side of the subplate; disposing the fixture adjacent the subplate on the first side of the subplate such that the receiving bore of the fixture is generally coaxial with the receiving bore of the subplate; disposing the D-shaped bushing in the fixture; receding the lock balls by moving the spindle to the second position; inserting the first end of the shank through the D-shaped bushing and through the receiving bore until the plurality of apertures are disposed within the second portion of the receiving bore, the D-shaped bushing inhibiting rotational movement of the shank; projecting the lock balls by moving the spindle to the first position; and rotating the torque-adjustable rotation system until the predetermined amount of torque is exceeded.

In an embodiment of the method, the disposing the D-shaped bushing in the receiving bore of the fixture comprising press-fitting the D-shaped bushing in the receiving bore of the fixture.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Figure 1:
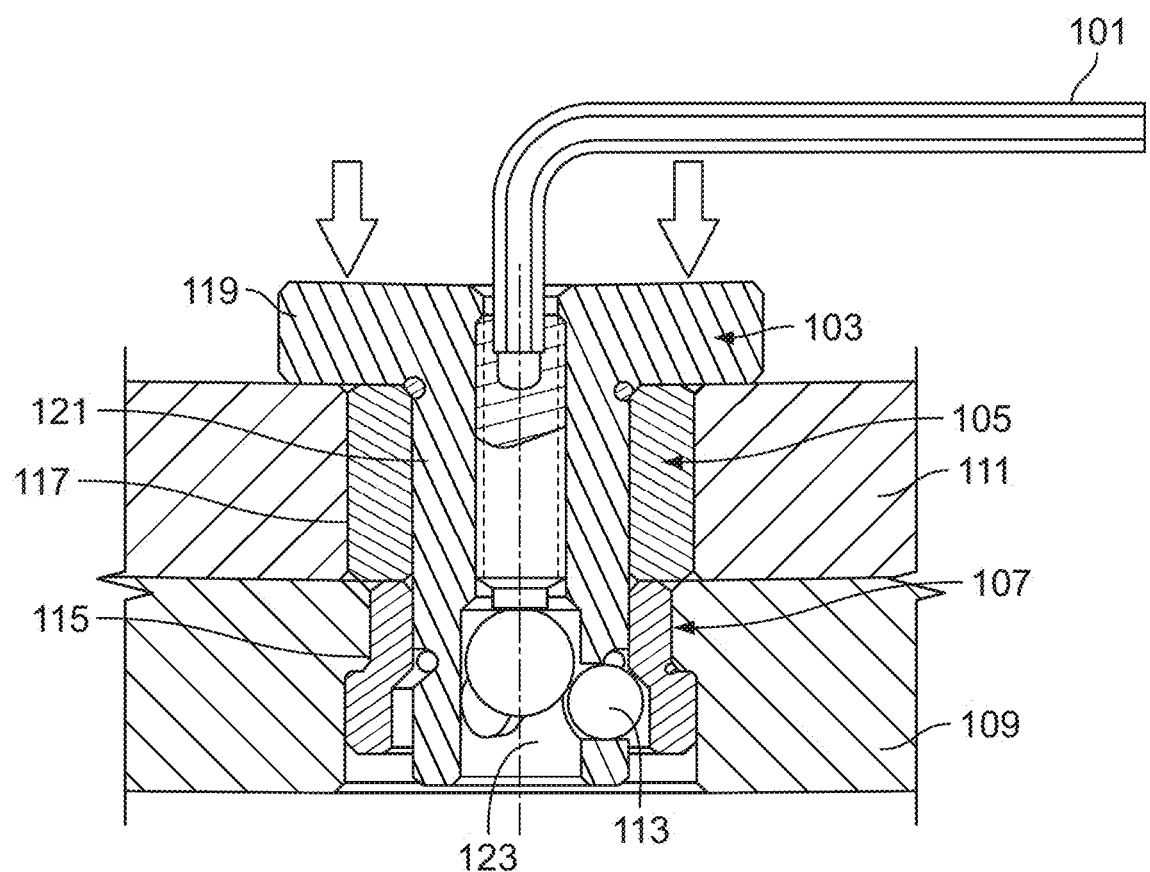
FIG. 1 depicts a prior art clamp for machining operations.
Figure 2:
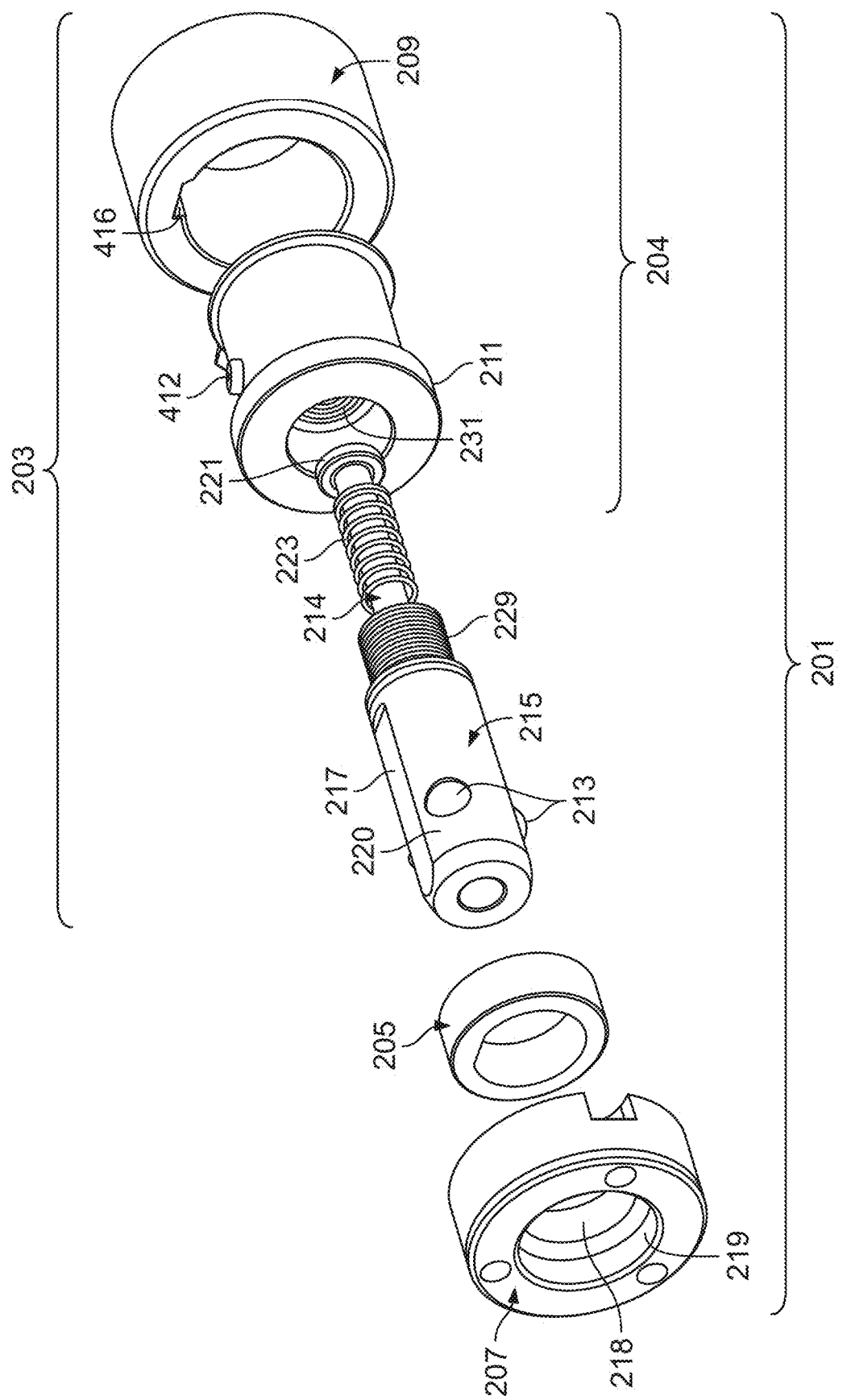
FIG. 2 depicts a perspective exploded view of a toolless clamp system for machining operations according to the present discloser.
Figure 3:
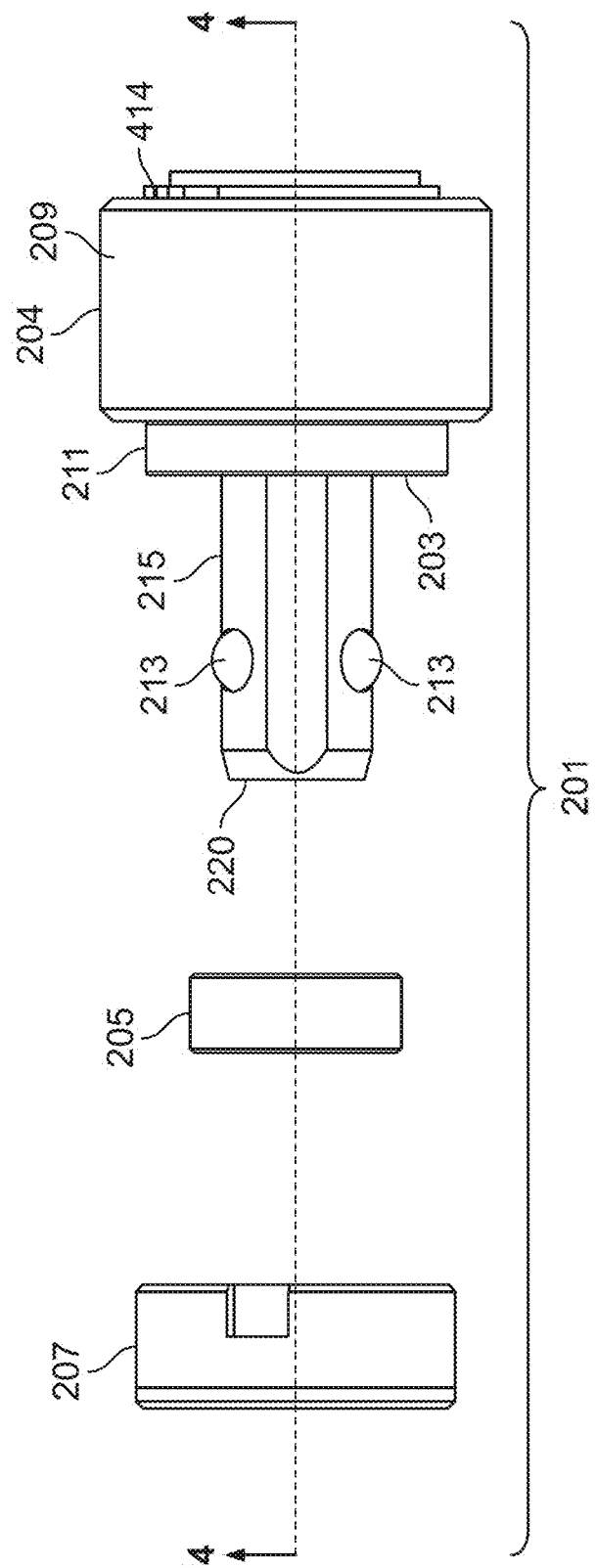
FIG. 3 depicts a side elevation view of a toolless clamp system for machining operations according to the present discloser.
Figure 4:
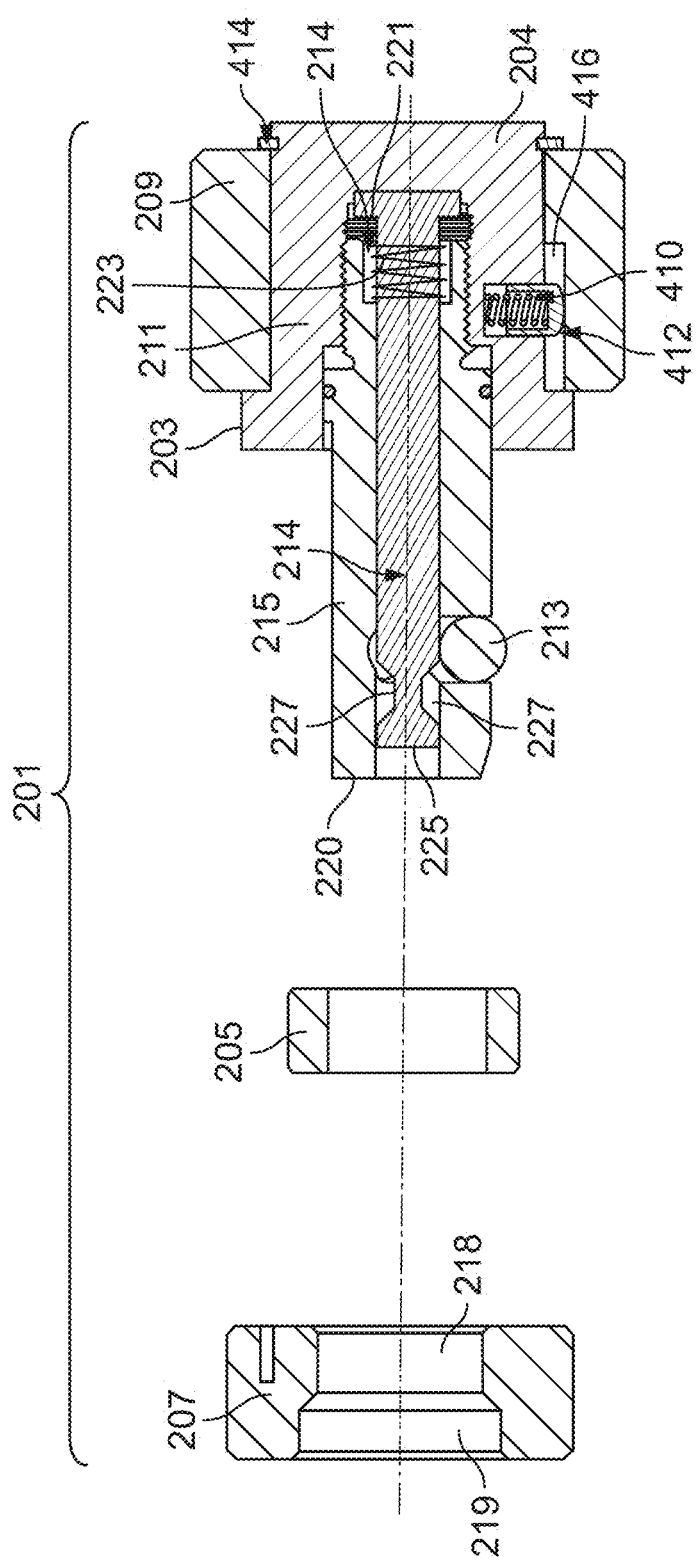
FIG. 4 depicts a sectional view of the toolless clamp system of FIG. 3.
Figure 5:
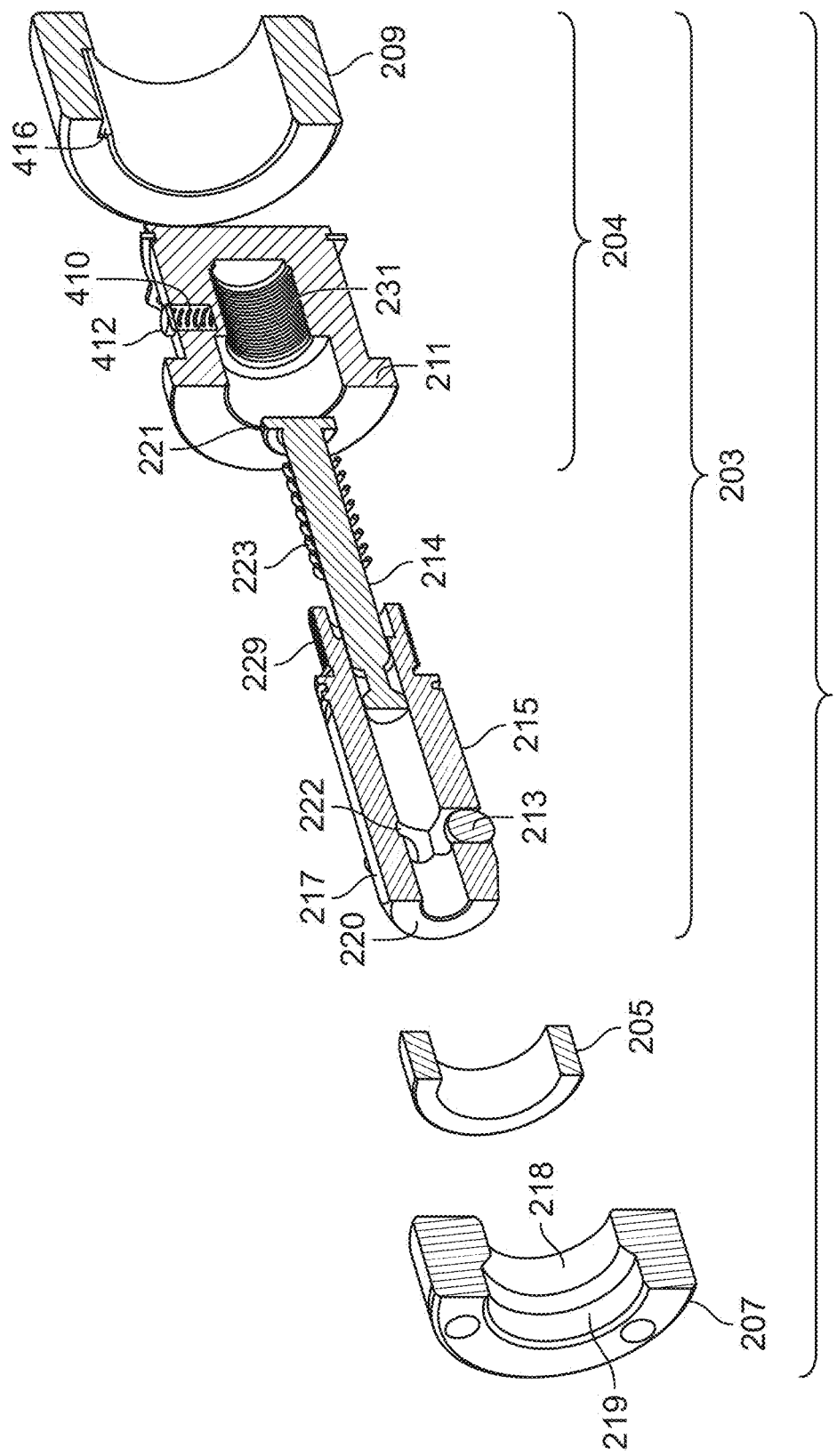
FIG. 5 depicts a perspective sectional view of the toolless clamp system of FIG. 3.

FIG. 2 depicts an embodiment of a toolless clamp (203) according to the present disclosure. In the depicted embodiment of FIG. 2, the toolless clamp (203) comprises a torque-limited rotation system (204) that may be manually tightened without use of a tool to advance a spring-actuated spindle (214) to lock balls (213), resulting in expansion within a receiver bushing (207) to lock the toolless clamp (201) in place. A D-shaped shank (215) is disposed in a corresponding D-shaped bushing (205) to inhibit unintended rotation. The toolless clamp (203), D-shaped bushing (205), and a receiver bushing (207), may together comprise a toolless clamping system (201) as shown. These and other elements are further depicted in other FIGs., and further described in this disclosure.

As shown in FIGS. 2, 3, 4, 5, and 6, the depicted toolless clamp (203) comprises a torque-limited rotation system (204). The depicted torque-limited rotation system (204) comprises an outer clutch handle element (209) and a corresponding inner clutch handle element (211). The depicted outer clutch handle element (209) is an elongated annular element having a smooth outer surface for comfortable and ergonomic manual gripping and twisting by a human operator. The depicted outer clutch handle element (209) comprises a groove (416) disposed on the interior surface. The depicted groove (416) has a first side in the configuration of a vertical or radial plane relative to the major axis of the outer clutch handle element (209), and an opposing second, sloping side. The groove (416) is sized and shaped to receive the distal end of the clutch plunger (410) described elsewhere herein.

The depicted inner clutch handle element (211) is an elongated, generally cylindrical element having an outer radius about the same as the inner radius of the outer clutch handle element (209). The inner clutch handle element (211) may then be disposed within the outer clutch handle element (209). The depicted inner clutch handle element (211) comprises a radial bore having an opening on the outer surface of inner clutch handle element (211). The inner clutch handle element (211) also has a radial bore extending from one side to an internal terminus. At least a portion of the inner surface of the radial bore is threaded (231). A clutch spring (410) is disposed within a clutch plunger (412), which is in turn disposed within the radial bore. The depicted radial bore extends from the outer opening to an opposing terminus within the inner clutch handle element (211).

The clutch spring (410) within the clutch plunger (412) is braced at one end against terminus, and applies force radially outward against the inner top surface of the clutch plunger (412). The depicted clutch plunger (412) has a height chosen so as to cause the distal, or outer top end of the clutch plunger (412) to protrude radially beyond the outer surface of the inner clutch handle element (211), applying radially outward force to the inner surface of the outer clutch handle element (209). When assembled, the distal end of the clutch plunger (412) may be disposed within the groove (416), in which case the clutch spring (410) is less tensioned (or not tensioned).

When the outer clutch handle element (209) is rotated from this configuration in a first direction causing the radial or flat side of the groove (416) to press against a side of the protruding clutch plunger (412), the clutch plunger (412) will be pushed and rotated, along with the outer clutch handle element (209), thereby also rotating the inner clutch handle element (211) in the same rotational direction. When the outer clutch handle element (209) is rotated in a second, opposing direction causing the sloped side of the groove (416) to press against a side of the protruding clutch plunger (412), the clutch plunger (412) rides along the slope, increasing tension on the clutch spring (410) and causing the clutch plunger (412) to retreat into the radial bore and apply increased friction pressure to the inner surface of the outer clutch handle element (209). This in turn causes the outer clutch handle element (209) to be capable of rotating freely and independently of the inner clutch handle element (211), if the amount of torque required to rotate the clamp exceeds a predetermined threshold amount.

DESCRIPTION OF THE PREFERRED EMBODIMENT(S)

This facilitates the torque-limiting feature, in that once a maximum desired amount of torque is achieved, the force applied by the clutch plunger will be insufficient to carry the inner clutch handle element (211) with the outer clutch handle element (209) and further twisting the outer clutch handle element (209) will result in slippage. However, rotation can be reversed, as rotating the outer clutch handle element (209) in the opposite direction will eventually cause the clutch plunger (412) to be captured in the groove (416) and rotate the inner clutch handle element (211) with the outer clutch handle element (209). The interior surface of the inner clutch handle element (211) includes an inner threaded surface (213) corresponding to an exterior threaded surface of a shank (215) as described elsewhere herein.

The depicted toolless clamp (203) further comprises a shank (215). In the depicted embodiment, the shank (215) is a generally cylindrical, hollow element having an axial bore sized and shaped to receive a spindle (214) described elsewhere herein. The depicted shank (215) is generally cylindrical except that one side of the shank (215) is flattened at a planer chord surface (217), giving the shank (215) a cross-section roughly in the configuration of a capital-D. This surface (217) is used to brace the shank (215)

using a corresponding flat surface of a receiver or bushing, which in turn allows the torque-limited-rotation system (204) to rotate without the shank (215) also rotating.

The depicted shank (215) is configured for use in a ball-lock pin system with a corresponding spindle (214). Examples of the structures and functioning of a ball-lock pin system are described in, for example, U.S. Pat. No. 3,101, 641, granted Aug. 27, 1963, the entire disclosure of which is incorporated herein by reference. At a first end (220) of the shank (215), a plurality of apertures (222) are disposed. Each aperture (222) is sized and shaped to partially retain a small lock ball (213). The lock balls (213) are sized and shaped such that they can partially project through the apertures (222), but cannot fully pass through the apertures (222). When partially projecting through the apertures (222) on different sides of the shank (215), the distance from the outer edge of one lock ball (213) to the axial center of the spindle (214), referred to herein as the "deployed radius," is greater than the radius of the shank (215). Thus, the toolless clamp (203) can be held in place by a receiver or retaining element, as described elsewhere herein, which has a through bore with a radius slightly larger than that of the shank (215) but smaller than the deployed radius.

To use the toolless clamp (203), the lock balls (213) are retracted, the distal end (220) is inserted through a receiving element bore, and then the lock balls (213) are projected on the distal (generally, bottom) side of the retaining element. Because the balls can be firmly held in place in projected position, the toolless clamp (203) cannot be retracted. Structures and methods of operation for deploying and retracting the balls are show in, for example, the aforementioned U.S. Pat. No. 3,101,641. In the depicted embodiment, the lock balls (213) are projected and retracted by use of a spindle (214) glidingly disposed in the hollow inner tube of the shank (215). The diameter of the hollow inner tube of the depicted shank (215) is generally consistent, except for the apertures, but wider at the end proximal the torque-limited-rotation system (204). This wider radius provides sufficient room to accommodate a tensioning element (223) which applies force axially to the spindle (214) to tend to advance the spindle (214) out of the shank (215), as further described elsewhere herein.

The depicted spindle (214) is operable from a first position in which it causes the lock balls (213) to project to a second position in which the lock balls (213) may recede. The depicted spindle (214) is a generally cylindrical element glidingly disposed within the inner tube of the shank (215). At a first end of the spindle (214) distal the apertures (222), the depicted spindle (214) has a cap or bracing element (221) having a radius larger than the main body of the spindle (214). The depicted tensioning element (223) is a spindle spring (223) coiled around the spindle (214) body and disposed between the bracing element (221), and the annular bottom of the wider portion of the hollow inner tube of the shank (215). Thus, when assembled, sliding the spindle (214) into the shank (215) will compress the tensioning element (223), which will in turn apply radial force tending to advance the spindle (214) out of the shank (215).

The end of the spindle (214) distal the tensioning element (223) includes an annular recess (227) adapted to partially receive the lock balls (213). In this manner, when the spindle (214) is advanced or retreated in the shank (215), when the annular recess (227) is adjacent the lock balls (213), the lock balls (213) can retreat, allowing the toolless clamp to be inserted or retrieved from a receiver. When the recess (227) is not adjacent the lock balls (213), the wider radius of the non-recessed portion of the spindle (214) causes the lock balls (213) to project, providing the ball-lock function described elsewhere herein.

When assembled, the recessed (227) end of the spindle (214) is inserted into the hollow inner tube of the shank (215), and the opposing end projects outwardly therefrom. The diameter of the brace element (221) is larger than that of the threaded end (229) of the shank (215), preventing the spindle (214) from retreating fully into the shank (215). This assembly is then threaded into the inner threads (231) of the inner clutch handle element (211). The outer, top surface of the bracing element (221) is then adjacent the inner terminus of the inner clutch handle element (211). When the inner clutch handle element (211) is rotated, force is exerted by the terminus on the top of the bracing element (221), which in turn compresses the tensioning element (223) (e.g., the spindle spring) and advances the spindle (214) in the shank (215).

In an embodiment, the inner clutch handle element (211) and outer clutch handle element (209) are held together using a retaining clip (414), and their respective radii are configured such that the friction between the inner surface of the outer clutch handle element (209) and the outer surface of the inner clutch handle element (211) is sufficient to cause the inner clutch handle element (211) to rotate when the outer clutch handle element (209) is rotated by hand, and when the tensioning element (223) is untensioned. As the outer clutch handle element (209) is rotated to advance the inner clutch handle element (211) downward along the threads (229), the tensioning element (223) will tension and the resistive force it applies outwardly will increase. The tensioning element (223) is selected such that the resistance force applied will be greater than the coefficient of friction between the inner clutch handle element (211) and outer clutch handle element (209) at a desired amount of torque, or tightening, after which continued rotation will not advance the spindle (214), but rather cause the outer clutch handle element (209) to "slip" and fail to rotate the inner clutch handle element (211). In this manner, the toolless clamp (203) may be manually tightened without the use of a tool, but overtightening and damage to the fixtures and/or workpieces, are prevented.

The toolless clamp (203) may be used as part of a toolless clamping system (201). The depicted system (201) comprises a toolless clamp (203) described herein, as well as a D-shaped bushing (205) and a receiver bushing (207). The depicted D-shaped bushing (205) is a generally annular bushing element having a chordal plane surface on one side, of about the same size, shape, and configuration of the chordal plane surface (217) on the shank (215). Thus, the shank (215) can only be inserted into the D-shaped bushing (205) by aligning the chordal plane of the shank (215) to that of the D-shaped bushing (205). The radius of the D-shaped bushing (205) is otherwise selected to closely match that of the shank (215), allowing for a snug fit in accordance with applicable industrial tolerances. The D-shaped bushing (205) prevents the shank (215) from rotating when the torque-adjustable-rotation system (204) is used, allowing for the ball-lock pin function to serve as a fixture clamp.

The receiver bushing (207) is also a generally annular element having a central bore sized and shaped to receive the ball-lock end (220) of the shank (215). The depicted receiver bushing (207) has a central bore with at least two radii-a first, small radius at a proximal end (218) through which the shank (215) passes during clamping, and a second, larger radius at a distal end (219), sufficient to receive and accommodate the projected lock balls (213). The deployed radius of the lock balls (213) is thus larger than the smaller radius (221) of the receiver bushing (207) but smaller than the larger radius (219) of the receiver bushing (207). In this fashion, the receiver bushing (207) may be used as a bracing or clamping surface for the ball-lock pin function of the toolless clamp (203).

Figure 6:
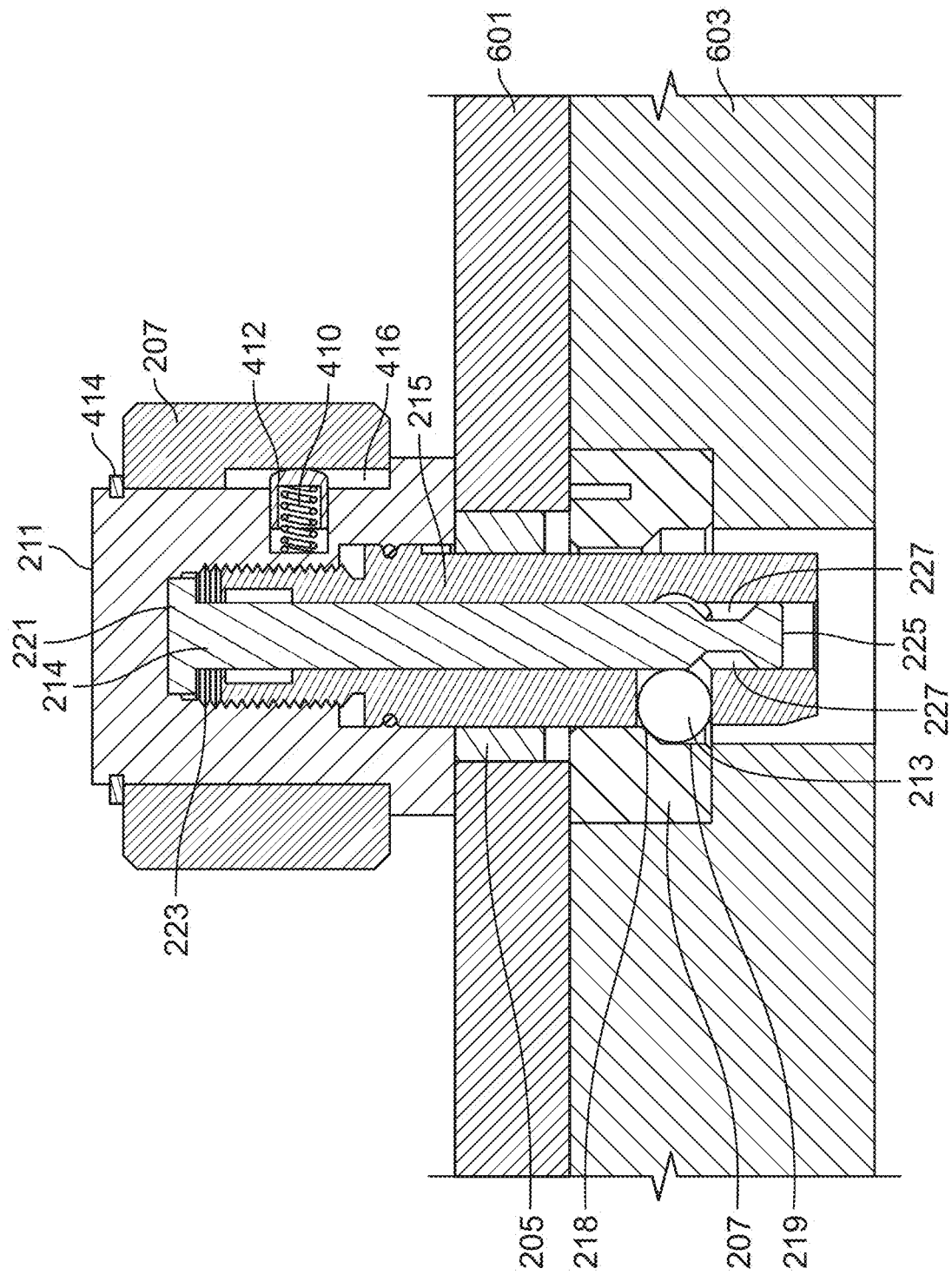
FIG. 6 depicts a side elevation sectional view of a toolless clamp system for machining operations according to the present discloser holding a fixture to a subplate.

As shown in FIG. 6, the system (201) may be used to clamp a fixture (601). In the system of FIG. 6, a fixture (601) is affixed to a subplate (603) using the toolless clamp (203) by disposing a receiver bushing (207) within a bore or recess in the subplate (603) such that the larger radius (219) is facing downward (or distal the direction from which the clamp is inserted). The fixture (601) is then disposed over the subplate (603) and the D-shaped bushing (205) is disposed within a corresponding fixture bore, coaxially aligned with the receiver bushing (207). The D-shaped bushing (205) may be held in place in the fixture by press-fitting, a lock pin, or another technique known in the art.

The ball-lock pin feature of the toolless clamp (203) is then disengaged (i.e., the balls recess) and the shank (215) is inserted through the D-shaped bushing (205), aligning the chordal plane surface (217) of the shank (215) with that of the D-shaped bushing (205), and through the receiver bushing (207), until the lock balls (213) are disposed within the larger radius (219) of the receiver bushing (207). The torque-limited-rotation system (204) is then manipulated by the user to advance the spindle (214) downward (or distal the direction from which the clamp is inserted) until the balls (213) project from the apertures, locking the shank (215) into place using the ball-lock pin function. When locked, the bottom surface of the inner clutch handle element (211) is pressed against the top of the fixture (601), providing clamping.

Throughout this disclosure, geometric terms may be used to characterize, among other things, sizes, shapes, dimensions, angles, distances, and relationships. These terms may be used with qualifiers such as "generally," "about," and "approximately." One of ordinary skill in the art will understand that, in the context of this disclosure, these terms are used to describe a recognizable attempt to conform a device or component to the qualified term. By way of example and not limitation, components described as being "generally coplanar" will be recognized by one of ordinary skill in the art to not be actually coplanar in a strict geometric sense because a "plane" is a purely geometric construct that does not actually exist and no component is truly "planer," nor are two components ever truly coplanar. Variations from geometric descriptions are unavoidable due to, among other things, manufacturing tolerances resulting in shape variations, defects, imperfections, non-uniform thermal expansion, natural wear, minor variations that are nevertheless recognizable as the qualified term, and other deformations. One of ordinary skill in the art will understand how to apply geometric terms, whether or not qualified by relative terms such as "generally," "about," and "approximately," to describe a reasonable range of variations from the literal geometric term in view of these and other considerations appropriate to the context. Additionally, the use of the conjunctive and disjunctive should not necessarily be construed as limiting, and the conjunctive may include the disjunctive, and vice versa.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

What is claimed is:

1. A toolless machine tooling clamp comprising:
a hand-operable torque-limited rotation system operably coupled to a ball-lock pin assembly having a generally D-shaped cross-section and comprising an outer clutch handle element operably coupled to an inner clutch handle element disposed within said outer clutch handle element, said outer clutch handle element being generally in the configuration of a hollow cylinder having an outer surface and an opposing inner surface, said outer surface sized and shaped for gripping and rotation by a human hand, and said inner surface comprises a groove, said groove comprising a first side disposed in the configuration of a radial plane relative to a major axis of said outer clutch handle element and an opposing, second side having a sloped configuration;
wherein said inner clutch handle element is generally in the configuration of a cylinder having an axial bore defining an inner surface and extending from a first end of said inner clutch handle element to a terminus within said inner clutch handle element;
wherein said inner clutch handle element further comprises:
an outer surface having a radius about the same as a radius of said inner surface of said outer clutch handle element and at least a portion of said inner surface of said inner clutch handle element is threaded;
a radial bore extending from said outer surface of said inner clutch handle element to a terminus disposed within said inner clutch handle element, said radial bore disposed at a position on said outer surface corresponding to said groove such that when said outer clutch handle element is rotated around said inner clutch handle element, said groove passes over said radial bore;
a clutch plunger generally in the configuration of a hollow cylinder having a first closed end and an opposing open end, said clutch plunger slidingly disposed within said radial bore with said first open end proximal said terminus; and
a clutch spring disposed within said clutch plunger, said clutch spring having a first end and an opposing second end, said first end extending through said open end of said clutch plunger and braced against said terminus, and said second end braced against an interior surface of said closed end of said clutch plunger, said clutch spring applying radially outward force to said clutch plunger to tend to cause said clutch plunger to retreat radially outward.

2. The toolless machine tooling clamp of claim 1, wherein said ball-lock pin assembly comprises:
a shank connected to said inner clutch handle element;
a spindle slidingly disposed in said shank;
a tensioning element tending to cause said spindle to retreat axially outward from said shank; and
a plurality of lock balls each disposed in one of a plurality of apertures of said shank;
wherein said shank comprises said D-shape cross-section.

3. The toolless machine tooling clamp of claim 2, wherein said spindle is in the configuration of a tubular shaft having a first radius and a first end comprising an annular recess having a second radius less than said first radius, and an opposing second end having an annular cap element having a third radius greater than said first radius, said cap element disposed within said inner clutch handle element axial bore and braced against said terminus of said inner clutch handle element.

4. The toolless machine tooling clamp of claim 3, wherein said shank comprises:
- a first portion comprising said generally D-shaped cross-section, said generally D-shaped cross-section comprising an arcuate portion having two ends connected by a chord to form a flattened chordal plane on said outer surface of said first portion;
- a second portion monolithically constructed with said first portion, said second portion in the configuration of a hollow, cylindrical element having external threads corresponding to said threads of said inner clutch handle element; and
- said plurality of apertures disposed proximal a first end of said first portion, said first end being distal said second portion;
- wherein said hollow first portion and of said hollow second portion form a contiguous axial bore coaxially receiving said spindle.

5. The toolless machine tooling clamp of claim 4, wherein each lock ball in said plurality of lock balls is disposed in said first portion of said shank in one of said plurality of apertures and sized and shaped to partially protrude from said one of said plurality of apertures when said spindle is disposed in said shank in a first position and to retreat from said apertures when said spindle is disposed in said shank in a second position.

6. The toolless machine tooling clamp of claim 5, wherein said tensioning element applies axial tension in a first axial direction to an end of said second portion distal said first portion, and applies axial tension in a second direction opposing said first direction to said cap element.

7. The toolless machine tooling clamp of claim 6, wherein:
- said spindle is operable to said first position in which said spindle recess is not adjacent said lock balls and said first radius causes each of said lock balls to project through said one of said plurality of apertures a distance greater than an outer radius of said first portion of said shank; and
- said spindle is operable to said second position in which said spindle recess is adjacent said lock balls and said second radius causes each of said lock balls to recede inward of said outer radius of said shank.

8. The toolless machine tooling clamp of claim 7, wherein a tension force of said clutch plunger on said inner surface of said outer clutch handle element is effective to cause said inner clutch handle element to rotate in a first direction of rotation when said outer clutch handle element rotates in said first direction, until an amount of torque applied to said outer clutch handle element exceeds a predetermined threshold amount of torque.

9. A toolless machine tooling clamp system comprising the toolless machine tooling clamp of claim 8, and a D-shaped bushing generally in the configuration of a hollow cylindrical element having an outer surface with a generally circular cross-section, and an inner surface having a D-shaped cross section comprising an arcuate portion having two ends connected by a chord to form a flattened chordal plane on said inner surface, said flattened chordal plane sized and shaped to receive said flattened chordal plane of said first portion of said shank.

10. The toolless machine tooling clamp system of claim 9, further comprising a receiving bushing generally in the configuration of a hollow cylindrical element having an outer surface and an opposing inner surface, said inner surface having a first portion having a first radius, said first radius being about the same as said outer radius of said arcuate portion of said first portion of said shank, and a second portion having a second radius, said second radius being larger than said first radius.

11. A method for using the toolless machine tooling clamp system of claim 10 to clamp a fixture to a subplate, the method comprising:
- providing a subplate having a receiving bore;
- providing a fixture having a receiving bore;
- disposing said receiver bushing in said receiving bore of said subplate such that said second portion of said receiver bushing is distal a first side of said subplate;
- disposing said fixture adjacent said subplate on said first side of said subplate such that said receiving bore of said fixture is generally coaxial with said receiving bore of said subplate;
- disposing said D-shaped bushing in said fixture;
- receding said lock balls by moving said spindle to said second position;
- inserting said first end of said shank through said D-shaped bushing and through said receiving bore until said plurality of apertures are disposed within said second portion of said receiving bore, said D-shaped bushing inhibiting rotational movement of said shank;
- projecting said lock balls by moving said spindle to said first position; and
- rotating said torque-adjustable rotation system until said predetermined amount of torque is exceeded.

12. The method of claim 11, wherein said disposing said D-shaped bushing in said receiving bore of said fixture comprising press-fitting said D-shaped bushing in said receiving bore of said fixture.

* * * * *